US012277356B2

(12) United States Patent
Ohara

(10) Patent No.: US 12,277,356 B2
(45) Date of Patent: Apr. 15, 2025

(54) IMAGE PROCESSING APPARATUS FOR REQUESTING ADMINISTRATOR TO PERFORM REGISTRATION OF IMAGE PROCESSING APPARATUS AND USER ON PRINT SERVICE APPARATUS, IMAGE PROCESSING SYSTEM, AND NON-TRANSITORY COMPUTER READABLE STORAGE MEDIUM

(71) Applicant: FUJIFILM Business Innovation Corp., Tokyo (JP)

(72) Inventor: Chie Ohara, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 352 days.

(21) Appl. No.: 17/702,760

(22) Filed: Mar. 23, 2022

(65) Prior Publication Data
US 2023/0091898 A1     Mar. 23, 2023

(30) Foreign Application Priority Data
Sep. 17, 2021   (JP) ................................ 2021-152569

(51) Int. Cl.
*G06F 3/12* (2006.01)
(52) U.S. Cl.
CPC .......... *G06F 3/1238* (2013.01); *G06F 3/1204* (2013.01); *G06F 3/1285* (2013.01); *G06F 3/1288* (2013.01)
(58) Field of Classification Search
None
See application file for complete search history.

(56) References Cited

U.S. PATENT DOCUMENTS

| | | | |
|---|---|---|---|
| 8,695,065 B2 * | 4/2014 | Kato | H04N 1/44 709/200 |
| 2015/0154484 A1 | 6/2015 | Iwasaki et al. | |
| 2019/0007404 A1 * | 1/2019 | Igari | G06F 21/608 |
| 2019/0050170 A1 * | 2/2019 | Ren | G06F 3/1288 |
| 2019/0294387 A1 * | 9/2019 | Sako | G06F 3/1222 |
| 2020/0233619 A1 * | 7/2020 | Hosoda | G06F 3/1239 |
| 2020/0301639 A1 * | 9/2020 | Ren | G06F 3/1271 |

FOREIGN PATENT DOCUMENTS

| | | |
|---|---|---|
| JP | 2015108925 | 6/2015 |
| JP | 2015108950 | 6/2015 |

* cited by examiner

*Primary Examiner* — Haris Sabah
(74) *Attorney, Agent, or Firm* — JCIPRNET

(57) ABSTRACT

An image processing apparatus includes a processor configured to: acquire a registration request that a user uses to request a print service apparatus to register the image processing apparatus and the user; acquire identification information on an administrator having an administrative right to the print service apparatus; in response to the registration request, request the print service apparatus to register the image processing apparatus and the user; and request the administrator identified by the identification information to perform authentication under the administrative right to register the image processing apparatus and the user on the print service apparatus by transmitting, to the administrator, authentication information, used to register the image processing apparatus, and identification information on the user that are acquired from the print service apparatus.

20 Claims, 10 Drawing Sheets

IMAGE PROCESSING APPARATUS FOR REQUESTING ADMINISTRATOR TO PERFORM REGISTRATION OF IMAGE PROCESSING APPARATUS AND USER ON PRINT SERVICE APPARATUS, IMAGE PROCESSING SYSTEM, AND NON-TRANSITORY COMPUTER READABLE STORAGE MEDIUM

CROSS-REFERENCE TO RELATED APPLICATIONS

This application is based on and claims priority under 35 USC 119 from Japanese Patent Application No. 2021-152569 filed Sep. 17, 2021

BACKGROUND

(i) Technical Field

The present disclosure relates to an image processing apparatus, an image processing system, and a non-transitory computer readable medium.

(ii) Related Art

Japanese Unexamined Patent Application Publication Nos. 2015-108950 and 2015-108925 disclose print systems where an image forming apparatus not registered by a user on a print service system receives print data from the print service system for printing.

The print system disclosed in Japanese Unexamined Patent Application Publication No. 2015-108950 includes an information processing apparatus and image forming apparatus. The information processing apparatus includes an acquisition unit and transmitting unit. The acquisition unit acquires, via near-field communication from the image forming apparatus, identification information on the image forming apparatus in a print service system. The transmitting unit transmits, to the print service system, a setting request that requests a setting for a user to use the image forming apparatus. The setting request includes the identification information on the image forming apparatus acquired by the acquisition unit and identification information on a user in the print service system. The image forming apparatus includes a storage unit that stores the identification information on the image forming apparatus in the print service system in a manner that allows the acquisition unit in the information processing apparatus to acquire the identification information.

The print system disclosed in Japanese Unexamined Patent Application Publication No. 2015-108925 includes an information processing apparatus and image forming apparatus. The information processing apparatus includes a permission information acquisition unit and transmitting unit. Using identification information on a user in a print service system and authentication information used to authenticate the identification information on the user, the print service system authenticates the user. If the user is successfully authenticated, the permission information acquisition unit acquires, from the print service system, access permission information related to the identification information on the user. The transmitting unit transmits the acquired access permission information to the image forming apparatus via the near-field communication. The image forming apparatus includes a transmitting unit that transmits, to the print service system, a setting request that requests a setting for a user corresponding to the access permission information to use the image forming apparatus. The setting request includes the access permission information transmitted from the information processing apparatus and the identification information on the image forming apparatus in the print service system.

A user of an image processing apparatus may be registered on a print service server providing a print service in the cloud. For example, as in "Universal Print" of Microsoft (registered trademark), an administrator having an administrative right to the printer service server, instead of a user actually using the image processing apparatus, may perform a registration operation. In such a case, when the user uses the image processing apparatus, the user may make a direct request to the administrator about the use of the image processing apparatus via email or telephone. Higher user workload may be involved in the registration of the user on the image processing apparatus.

SUMMARY

Aspects of non-limiting embodiments of the present disclosure relate to providing an image processing apparatus, image processing system, and non-transitory computer readable medium that involve lower workload in registration of a user on an image processing apparatus than when the user makes to an administrator a direct request in connection with the use of the image processing apparatus.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided an image processing apparatus including a processor configured to: acquire a registration request that a user uses to request a print service apparatus to register the image processing apparatus and the user; acquire identification information on an administrator having an administrative right to the print service apparatus; in response to the registration request, request the print service apparatus to register the image processing apparatus and the user; and request the administrator identified by the identification information to perform authentication under the administrative right to register the image processing apparatus and the user on the print service apparatus by transmitting, to the administrator, authentication information, used to register the image processing apparatus, and identification information on the user that are acquired from the print service apparatus.

BRIEF DESCRIPTION OF THE DRAWINGS

Exemplary embodiments of the present disclosure will be described in detail based on the following figures, wherein.

DETAILED DESCRIPTION

Figure 1:
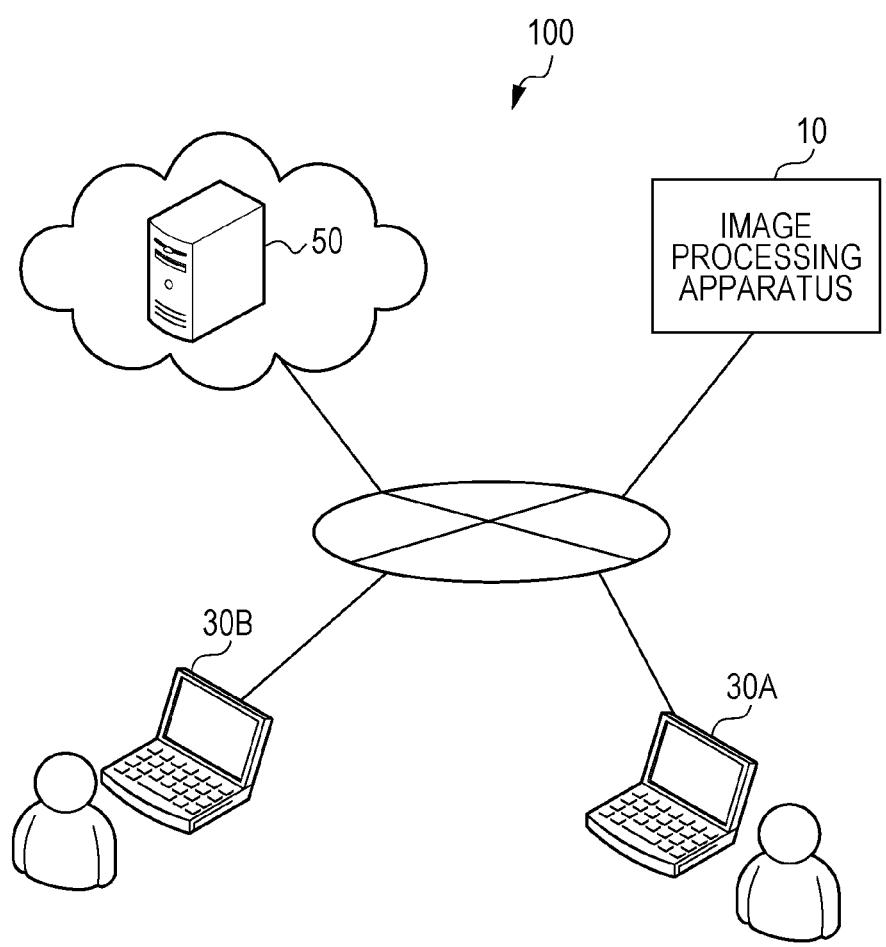
FIG. 1 illustrates an example of a configuration of an image processing system of a first exemplary embodiment.

Referring to the drawings, exemplary embodiments of the disclosure are described in detail below. Elements and processes having the same operations and functions are designated with the same reference numerals throughout the drawings and duplicate explanation thereof is omitted as appropriate. The drawings are illustrated to a schematical level that allows readers to understand the techniques disclosed herein. The techniques disclosed herein are not limited to those illustrated in the drawings. Configuration not directly related to the disclosure and configuration in the related art may not be described.

First Exemplary Embodiment

FIG. 1 illustrates an example of a configuration of an image processing system 100 of a first exemplary embodiment.

Referring to FIG. 1, the image processing system 100 includes an image processing apparatus 10, user terminal 30A, administrator terminal 30B, and print service server 50. The print service server 50 provides a print service over the cloud. The print service server 50 is an example of a print service apparatus. The print service server 50 is a general-purpose computer, such as a server computer or personal computer (PC).

The user terminal 30A is used by a user that utilizes the image processing apparatus 10. The user terminal 30A may be a smart phone or PC. The user herein does not have an administrative right to the print service server 50 and is a target that is registered on the print service server 50 as a user of the image processing apparatus 10. The administrator terminal 30B is used by an administrator that has the administrative right to the print service server 50. The administrator terminal 30B may be a smart phone or PC. The administrator has the administrative right to a group (such as a company or a division in the company) registered on the print service server 50.

The image processing apparatus 10, user terminal 30A, administrator terminal 30B, and print service server 50 are connected to each other via a network, such as the Internet, local-area network (LAN), and/or wide-area network (WAN). The image processing apparatus 10, user terminal 30A, and administrator terminal 30B are located physically apart from each other. For example, the image processing apparatus 10 may be installed at a convenience store as a destination of the user or any other place that is different from a base where the user normally works.

Figure 2:
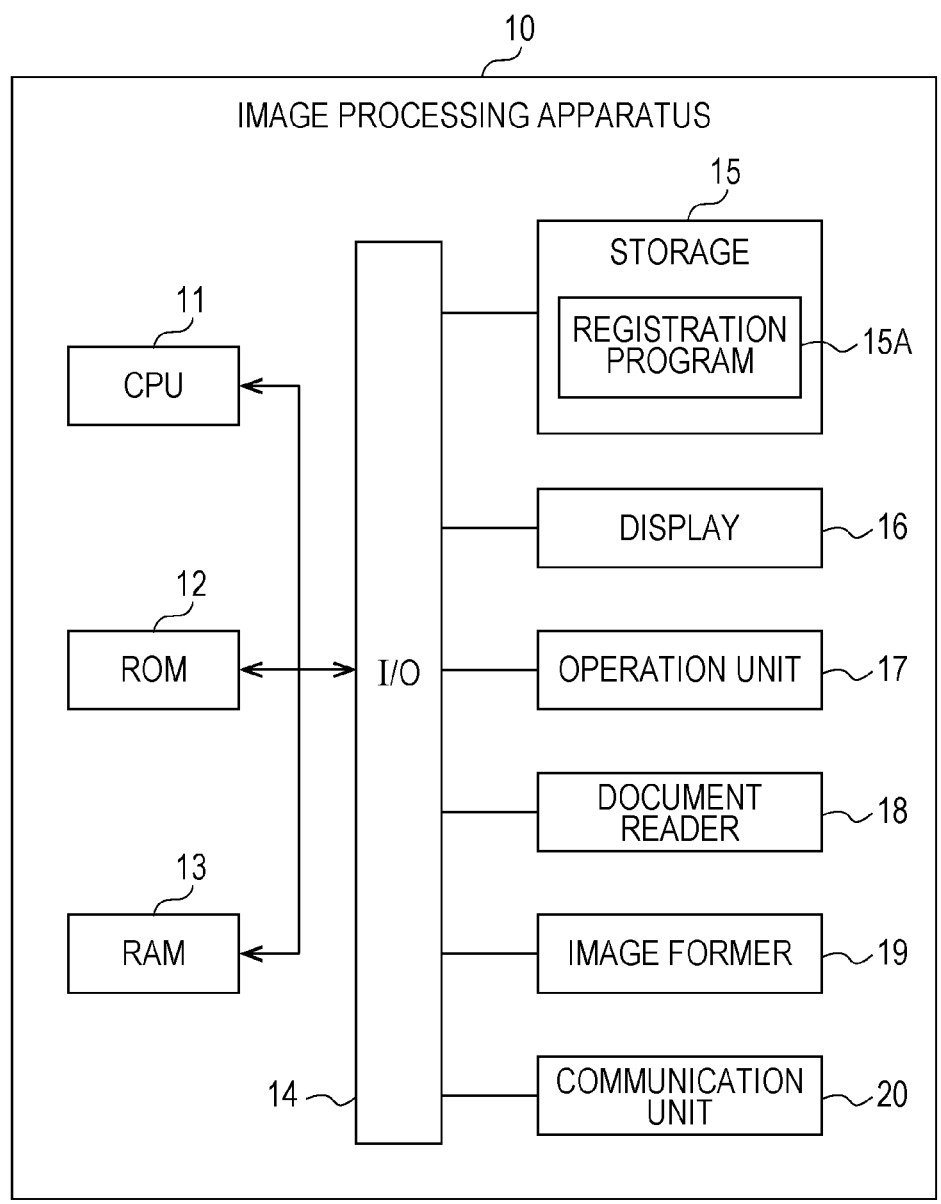
FIG. 2 is a block diagram illustrating an example of an electrical configuration of an image processing apparatus of the first exemplary embodiment.

FIG. 2 is a block diagram illustrating an example of an electrical configuration of the image processing apparatus 10 of the first exemplary embodiment.

Referring to FIG. 2, the image processing apparatus 10 of the first exemplary embodiment includes a central processing unit (CPU) 11, read-only memory (ROM) 12, random-access memory (RAM) 13, input and output (IO) interface 14, storage 15, display 16, operation unit 17, document reader 18, image former 19, and communication unit 20.

The CPU 11, ROM 12, RAM 13, and IO interface 14 are connected to each other via a bus. The IO interface 14 connects to functional blocks, including the storage 15, display 16, operation unit 17, document reader 18, image former 19, and communication unit 20. These functional blocks are communicable with the CPU 11 via the IO interface 14.

The CPU 11, ROM 12, RAM 13, and IO interface 14 form a controller. The controller may be configured to control part or whole of the image processing apparatus 10. Part or whole of the controller may be an integrated circuit, such as large-scale integration (LSI) chip. The blocks described above may have respective circuits or some or all of the blocks may be integrated into a single circuit. Some or all of the blocks may be integrated into a unitary body. Part of each of the blocks may be separately arranged. The integration of the controller is not limited to the LSI chip. The integration of the controller may be implemented by a dedicated circuit or a general-purpose processor.

The storage 15 may be a hard disk drive (HDD), solid-state drive (SSD), or flash memory. The storage 15 stores a registration program 15A of the first exemplary embodiment. The registration program 15A may also be stored on the ROM 12.

The registration program 15A may be pre-installed on the image processing apparatus 10. The registration program 15A may be appropriately installed on the image processing apparatus 10 by storing the registration program 15A on a non-volatile recording medium or delivering the registration program 15A via a network. Examples of the non-volatile memory include a compact disc read-only memory (CD-ROM), magneto-optical disk, HDD, digital versatile disc ROM (DVD-ROM), flash memory, and memory card.

The display 16 may a liquid-crystal display (LCD) or organic electroluminescent (EL) display. The display 16 may include a touch panel that is integrated therewith. The operation unit 17 includes operation keys, including numerical keys, and start key. The display 16 and operation unit 17 work as an operation panel and receive, from the user of the image processing apparatus 10, a variety of instructions related to display operation functions and settings. For example, the instructions include an instruction to start reading an original document, instruction to start copying the original document, instruction to print data in response to print data stored on the image processing apparatus 10, and other instructions. The display 16 displays results of operations performed in response to an instruction received from the user and a variety of information including a notification about an operation.

The document reader 18 picks up sheet by sheet the document sheets stacked on a document feeder plate at the top of the image processing apparatus 10 and optically reads the document sheet picked up to acquire image information.

Alternatively, the document reader 18 optically reads a document sheet placed on a document feeder such as a platen glass to acquire image information.

The image former 19 forms on a paper sheet, serving as an example of a recording medium, image that is based on the image information that the document reader 18 has acquired by reading the document or the image information that has been acquired in response to a print instruction from an external apparatus. The method of forming image used in the following discussion is an electrophotographic system. Alternatively, other methods including an ink-jet system may also be used.

If the method of forming image is the electrophotographic system, the image former 19 includes a photoconductor drum, charging device, exposure device, development device, transfer device and fixing device. The charging device charges the surface of the photoconductor drum by applying a voltage to the photoconductor drum. The exposure device forms an electrostatic latent image on the photoconductor drum by exposing the charged photoconductor drum to light beams responsive to the image information. The development device forms a toner image on the photoconductor drum by applying toner to the electrostatic latent image formed on the photoconductor drum. The transfer device transfers the toner image on the photoconductor drum to a paper sheet. The fixing device fixes the toner image transferred to the paper sheet onto the paper sheet by heating and pressing the toner image.

The communication unit 20 is connected to a network, such as the Internet, LAN, and/or WAN, and may communicate with each of the user terminal 30A, administrator terminal 30B, and print service server 50.

Figure 3:
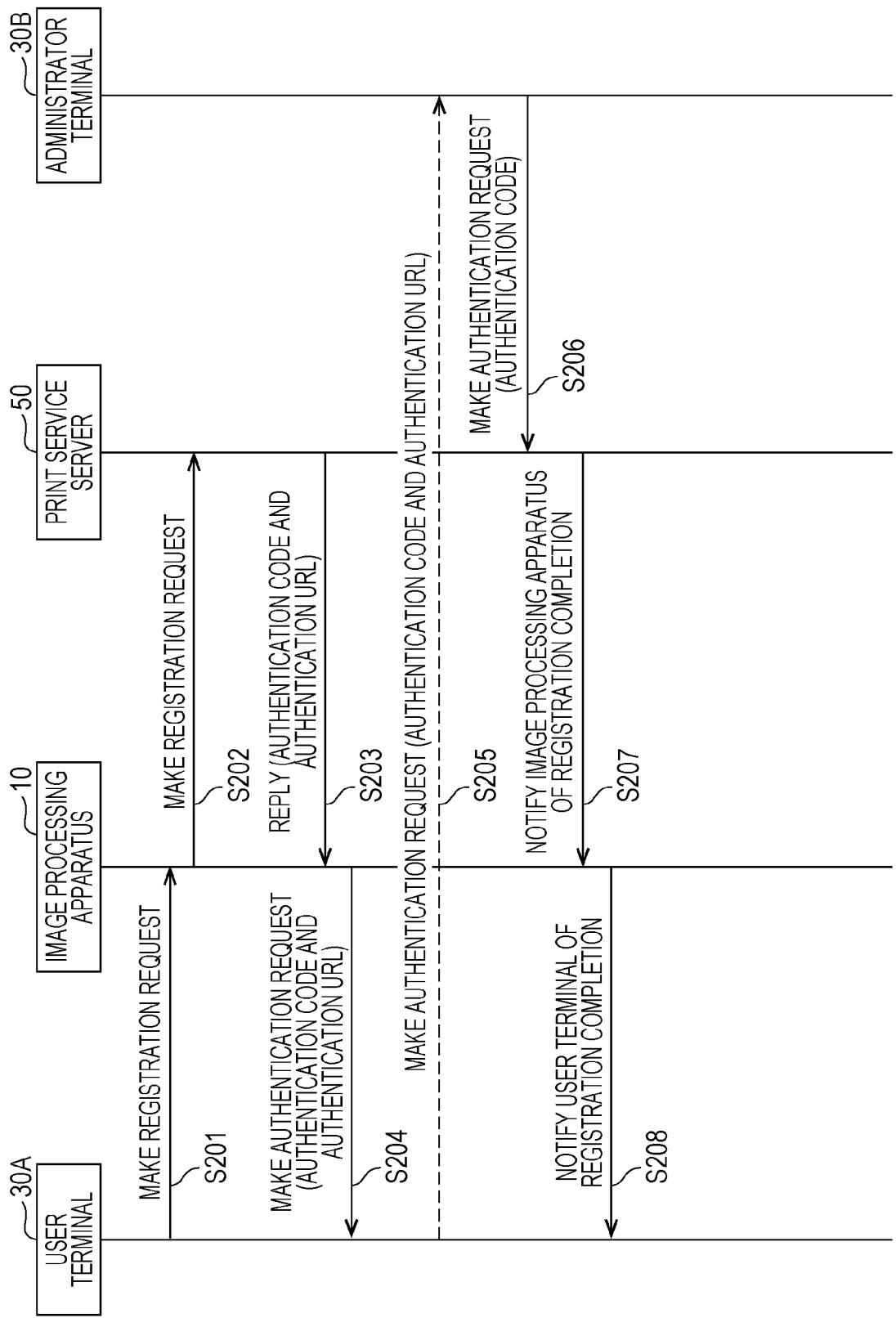
FIG. 3 is a sequence diagram illustrating a method of registering an image processing apparatus as a comparative example and a user of the image processing apparatus.

The image processing apparatus 10 may be registered on the print service server 50 in FIG. 1 and a user accessible to the network may provide a print instruction to the print service server 50. The user at any location may print using the image processing apparatus 10. In order to register the image processing apparatus 10 and the user thereof on the print service server 50, the image processing apparatus 10 and the user may be authenticated not by the user actually using the image processing apparatus 10 but by an administrator having the administrative right to the print service server 50. In such a case, if the authentication has been successfully performed by the administrator, the image processing apparatus 10 is registered on the print service server 50 and the user of the image processing apparatus 10 is also registered on the print service server 50. Referring to FIG. 3, a method of registering the image processing apparatus 10 as a comparative example and the user thereof is described below.

FIG. 3 is a sequence diagram illustrating a method of registering the image processing apparatus 10 and the user thereof in the comparative example.

In step S201 in FIG. 3, the user makes a registration request requesting the print service server 50 to register the image processing apparatus 10 and the user, by using an operation panel of the image processing apparatus 10 or a user interface (UI) screen of the user terminal 30A connected to the network connected to the image processing apparatus 10. The registration request includes the identification information on the user, such as an email address of the user.

In step S202, in response to the registration request from the user, the image processing apparatus 10 makes a registration request to the print service server 50 to register the image processing apparatus 10 and the user.

In step S203, in response to the registration request from the image processing apparatus 10, the print service server 50 replies to the image processing apparatus 10, transmitting authentication information to be used in the registration of the image processing apparatus 10. For example, the authentication information includes an authentication code identifying an authentication operation and an authentication uniform resource locator (URL) serving as a destination of the authentication information used to perform the authentication operation.

In step S204, in response to the reply from the print service server 50, the image processing apparatus 10 transmits to the user terminal 30A (or the user) an authentication request including the authentication information.

In step S205, in response to the authentication request from the image processing apparatus 10, the user terminal 30A (or the user) requests the administrator terminal 30B (or the administrator) to perform authentication under the administrative right by transmitting the authentication information to the administrator terminal 30B (or the administrator) via email, telephone, or the like.

In step S206, the administrator terminal 30B accesses the print service server 50 by using the authentication URL included in the authentication information, transmits the authentication code to the print service server 50, and makes an authentication request under the administrative right to the print service server 50 to register the image processing apparatus 10 and the user.

In step S207, in response to the authentication request from the administrator terminal 30B, the print service server 50 performs authentication for the registration of the image processing apparatus 10 and the user. After successful authentication, the print service server 50 notifies the image processing apparatus 10 of the registration completion.

In step S208, in response to the notification of the registration completion from the print service server 50, the image processing apparatus 10 notifies the user terminal 30A (or the user) of the registration completion.

Referring to the comparative example in FIG. 3, the user directly requests the administrator to perform the authentication under the administrative right using email, telephone, or the like. This operation is time consuming to the user and workload on the user of the image processing apparatus 10 involved in the registration is relatively higher.

In response to a registration request of a (temporary) user to the print service server 50, the image processing apparatus 10 of the first exemplary embodiment requests the print service server 50 to register the user as a user of the image processing apparatus 10. The image processing apparatus 10 transmits, to the administrator having the administrative right to the print service server 50, the authentication information acquired from the print service server 50 and the identification information on the user, and requests the administrator to perform the authentication under the administrative right to register as the user the user of the image processing apparatus 10 on the print service server 50.

Figure 4:
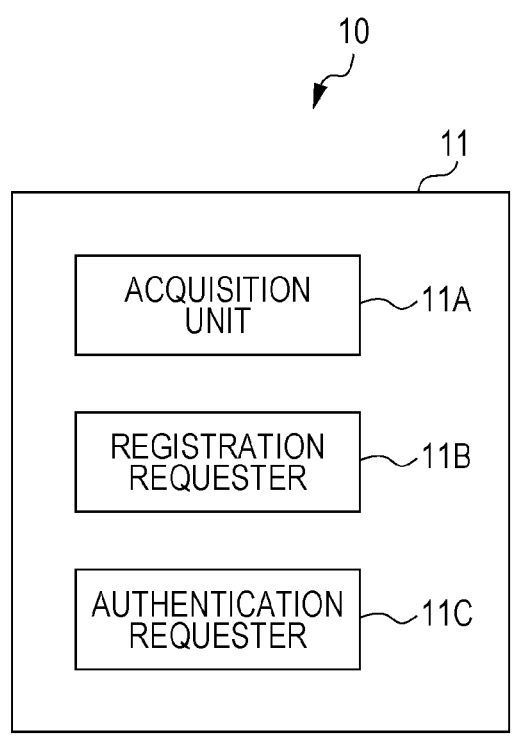
FIG. 4 is a block diagram illustrating an example of a functional configuration of the image processing apparatus of the first exemplary embodiment.

Specifically, the CPU 11 in the image processing apparatus 10 of the first exemplary embodiment operates as the functional blocks in FIG. 4 by loading the registration program 15A from the storage 15 onto the RAM 13 and executing the registration program 15A. The CPU 11 is an example of a processor.

FIG. 4 is a block diagram illustrating an example of a functional configuration of the image processing apparatus 10 of the first exemplary embodiment.

Referring to FIG. 4, the CPU 11 in the image processing apparatus 10 of the first exemplary embodiment includes an acquisition unit 11A, registration requester 11B, and authentication requester 11C.

The acquisition unit 11A acquires the registration request that the user uses to request the print service server 50 to register the image processing apparatus 10 and the user. The registration request includes the identification information on the user. The identification information on the user may be any information that serves to identify the user over the network. For example, the identification information on the user may an email address or a print service user identification (ID) as user ID information on the print service server 50. The registration request may be entered by the user. The registration request from the user may be received on an operation panel on the image processing apparatus 10. Alternatively, if the image processing apparatus 10 is connected to the user terminal 30A, the registration request may be received on the user terminal 30A.

The acquisition unit 11A acquires the identification information on the administrator having the administrative right to the print service server 50. The identification information on the administrator may be any information that serves to identify the administrator over the network. For example, the identification information on the administrator may be an email address or a print service user ID of the administrator serving as the identification information on the administrator of the print service server 50. The identification information on the administrator may be included in the registration request when the user enters the registration request or may be pre-stored on the storage 15 in the image processing apparatus 10.

In response to the registration request acquired by the acquisition unit 11A, the registration requester 11B requests the print service server 50 to register the image processing apparatus 10 and the user. In response to the registration request, the registration requester 11B acquires the authentication information used to register the image processing apparatus 10. The authentication information includes the authentication code and authentication URL.

If the authentication code has expired, the registration requester 11B may retry transmitting to the print service server 50 the registration request of the image processing apparatus 10 and the user to acquire a new authentication code and a new authentication URL from the print service server 50. In such a case, the registration requester 11B may iterate the registration request of the image processing apparatus 10 and the user by a predetermined number of iterations. The number of iterations may be within a range of from twice or more and ten times or less. The number of iterations may be specified by the user at the registration request or may be preset on the image processing apparatus 10.

The authentication requester 11C emails the authentication information acquired from the print service server 50 and the identification information on the user to an email address of the administrator identified by the identification information on the administrator or to a terminal (such as the administrator terminal 30B) logged on by the administrator identified by the identification information on the administrator. The authentication requester 11C thus requests the administrator to perform the authentication under the administrative right to register the image processing apparatus 10 and the user on the print service server 50.

A method of registering the image processing apparatus 10 and the user in accordance with the first exemplary embodiment is specifically described with reference to FIG. 5.

Figure 5:
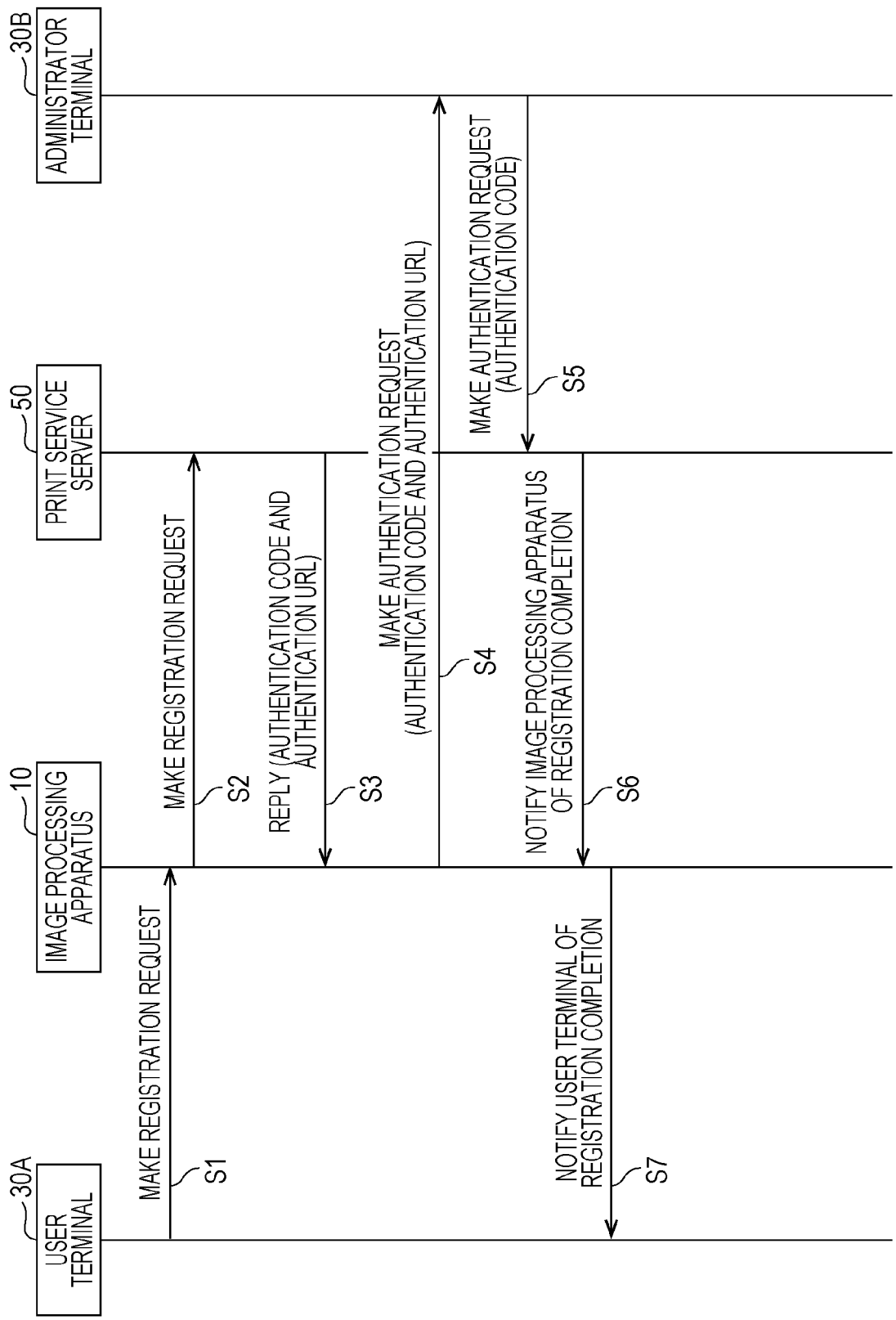
FIG. 5 is a sequence diagram illustrating a method of registering an image processing apparatus of the first exemplary embodiment and a user of the image processing apparatus.

FIG. 5 is a sequence diagram illustrating an example of the method of registering the image processing apparatus 10 and the user in accordance with the first exemplary embodiment.

In step S1 in FIG. 5, the user uses the operation panel of the image processing apparatus 10 or connects the user terminal 30A to the network connected to the image processing apparatus 10 such that the registration request is transmitted to request the print service server 50 to register the image processing apparatus 10 and the user. The registration request includes the email address of the user as the identification information on the user and the email address of the administrator as the identification information on the administrator. If the image processing apparatus 10 stores information on the administrator of the image processing apparatus 10, the user is free from entering the identification information on the administrator in step S1.

In step S2, in response to the registration request, the image processing apparatus 10 transmits the registration request of the image processing apparatus 10 and the user to the print service server 50. If the image processing apparatus 10 has been registered on the print service server 50, the next and subsequent steps are not performed. The administrator may be notified of identification information on the user having made the registration request and may be requested to permit the user to use the image processing apparatus 10.

In step S3, in response to the registration request from the image processing apparatus 10, the print service server 50 replies transmitting to the image processing apparatus 10 the authentication information used to register the image processing apparatus 10. For example, the authentication information includes the authentication code and authentication URL.

In step S4, in response to the reply from the print service server 50, the image processing apparatus 10 emails to the email address of the administrator an authentication request including the identification information on the user and the authentication information.

In step S5, the administrator references the received authentication request and accesses the print service server 50 using the authentication URL included the authentication information. The print service server 50, when being accessed via the authentication URL, creates a screen that receives the authentication code and the identification information on the user using the image processing apparatus 10 and then provides the screen to the administrator terminal 30B. The administrator enters, on the screen displayed on the administrator terminal 30B, the authentication code and the identification information on the user who is provided with the right to use the image processing apparatus 10. The administrator transmits the authentication code and the identification information on the user to the print service server 50 and makes the authentication request under the administrative right to the print service server 50 to register the image processing apparatus 10 and the user. The administrator may enter user identification information on the administrator and password to the print service server 50 such that the administrator is authenticated by the print service server 50.

In step S6, in response to the authentication request from the administrator terminal 30B, the print service server 50 performs authentication to register the image processing apparatus 10 and the user. If the authentication to register the image processing apparatus 10 and the user has been successfully completed, the print service server 50 notifies the image processing apparatus 10 of the registration completion. The print service server 50 authenticates the administrative right in accordance with the identification information on the user and password about the administrator included in the authentication request and determines whether the transmitted identification information on the user has been registered as a print service. If the identification information on the user has been registered, the print service server 50 registers the user as a user permitted to use the image processing apparatus 10. If the identification information on the user has not been registered, the user is requested to perform print service authentication. If the print service authentication is completed, the print service server 50 registers the user as a user permitted to use the image processing apparatus 10. In the print service authentication, an email with URL of an authentication request screen attached thereto is transmitted to the email address as the identification information on the user. The user may enter account information on the print service and password on a print service authentication screen that is displayed by accessing the URL described in the email. The print service authentication may thus be completed. The notification of the registration completion may be performed in a pull scheme. In the pull scheme, the image processing apparatus 10 inquires the print service server 50 of the registration completion by periodically polling the print service server 50. The image processing apparatus 10 thus acquires the notification of the registration completion. Alternatively, the notification of the registration completion may be performed in a push scheme. In the push scheme, the print service server 50 notifies the image processing apparatus 10 of the registration completion with the image processing apparatus 10 and the print service server 50 remaining in session connection.

In step S7, in response to the notification of the registration completion from the print service server 50, the image processing apparatus 10 notifies the user of the registration completion. If the image processing apparatus 10 remains connected to the user terminal 30A via the network, the user terminal 30A is notified of the registration completion. Alternatively, an indication indicating the registration completion for the user is displayed on the display 16 in the image processing apparatus 10. In this way, the user may use the image processing apparatus 10 via the print service server 50. With the image processing apparatus 10 registered on the print service server 50, the user may upload a printed material to the print service server 50, the print service server 50 may create a print job that the image processing apparatus 10 is enabled to print, and the image processing apparatus 10 may acquire the print job from the print service server 50 and output print results.

The process of the image processing apparatus 10 of the first exemplary embodiment is described below with reference to FIG. 6.

Figure 6:
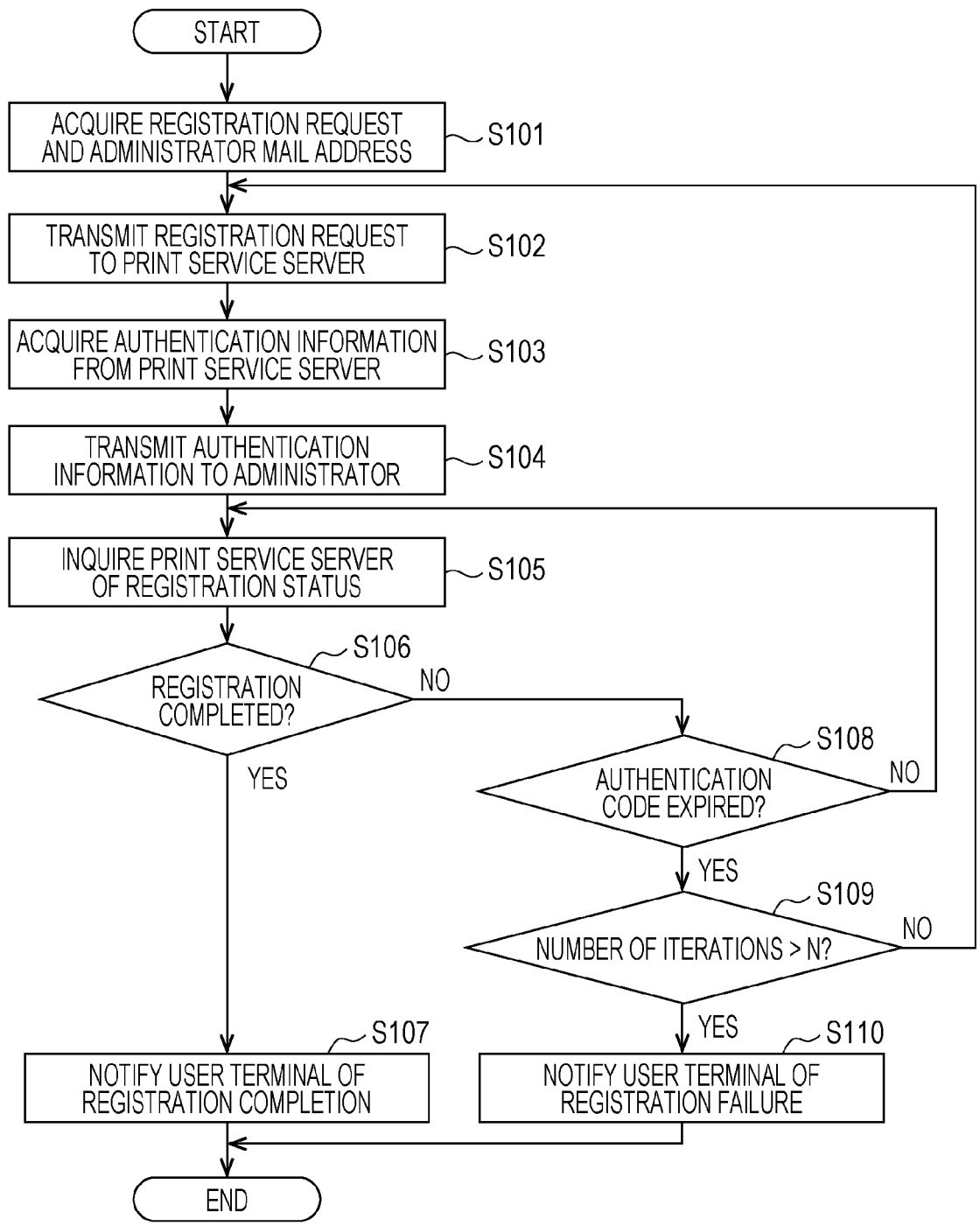
FIG. 6 is a flowchart illustrating a flow of a process of a registration program of the first exemplary embodiment.

FIG. 6 is a flowchart illustrating the flow of the process of the registration program 15A of the first exemplary embodiment.

When the image processing apparatus 10 is instructed to perform a printer registration operation, the CPU 11 starts up the registration program 15A and the following steps are performed.

In step S101 in FIG. 6, the CPU 11 acquires the registration request that the user makes to request the print service server 50 to register the image processing apparatus 10 and the user. The CPU 11 thus acquires an email address of the administrator serving as an example of the identification information on the administrator entered by the user or stored on the image processing apparatus 10. The registration request from the user may be acquired on the operation panel of the image processing apparatus 10 or on the user terminal 30A connected to the network connected to the image processing apparatus 10. The registration request also includes an email address serving as an example of the identification information on the user. The email address of the administrator may be included in the registration request or may be pre-stored on the storage 15.

In step S102, the CPU 11 performs control to transmit the registration request acquired in step S101 to the print service server 50. If the image processing apparatus 10 has been registered on the print service server 50, the next and subsequent steps are not performed. The administrator may be notified of the identification information on the user having made the registration request and may be requested to permit the user to use the image processing apparatus 10.

In step S103, the CPU 11 acquires from the print service server 50 the authentication information used to register the image processing apparatus 10. As previously described, the authentication information includes the authentication code and authentication URL.

In step S104, the CPU 11 transmits the authentication information acquired in step S103 and the email address of the user to the email address of the administrator, and requests the administrator to perform the authentication under the administrative right to register the image processing apparatus 10 and the user on the print service server 50.

In step S105, the CPU 11 inquires the print service server 50 of the registration status of the image processing apparatus 10 and the user to determine whether the image processing apparatus 10 and the user have been registered in accordance with the authentication under the administrative right.

In step S106, based on results of the inquiry in step S105, the CPU 11 determines whether the image processing apparatus 10 and the user have been registered on the print service server 50. If the CPU 11 determines that the image processing apparatus 10 and the user have been registered (yes path in step S106), the process proceeds to step S107. If the CPU 11 determines that the image processing apparatus 10 and the user have not been registered (no path in step S106), the process proceeds to step S108.

In step S107, the CPU 11 notifies the user of the registration completion of the image processing apparatus 10 and the user and thus completes a series of operations of the registration program 15A. The user terminal 30A is notified of the registration completion if the user has made the registration request on the user terminal 30A connected to the image processing apparatus 10. If the user has made the registration request on the operation panel of the image processing apparatus 10, the registration completion is displayed for notification on the operation panel.

In step S108, the CPU 11 determines whether the authentication code included in the authentication information has expired (i.e., whether the authentication code is valid or not). If the CPU 11 determines that the authentication code has expired (is not valid) (yes path in step S108), the process proceeds to step S109. If the CPU 11 determines that the authentication code has not expired (is valid) (no path in step S108), the process returns to step S105 and the CPU 11 makes the inquiry again.

In step S109, the CPU 11 determines whether the number of iterations of the registration request of the image processing apparatus 10 and the user has exceeded a predetermined number of times set on the image processing apparatus 10 (N times). If the CPU 11 determines that the number of iterations has exceeded N (yes path in step S109), the process proceeds to step S110. If the CPU 11 determines that the number of iterations is equal to or below N (no path in step S109), the process returns to step S102 for iteration.

In step S110, the CPU 11 notifies the user terminal 30A of a registration failure of the image processing apparatus 10 and the user and completes the series of operations of the registration program 15A. The user terminal 30A is notified of the registration failure if the user has made the registration request using the user terminal 30A. If the user has made the registration request on the operation panel of the image processing apparatus 10, the notification of the registration failure is displayed on the operation panel.

According to the first exemplary embodiment, when the user is registered as the user of the image processing apparatus 10 on the print service server 50, the user is free from directly requesting the administrator to perform authentication under the administrative right. This operation may be not time-consuming to the user and workload on the user involved in the registration of the user of the image processing apparatus 10 may be lighter.

Second Exemplary Embodiment

A second exemplary embodiment is related to a printer management service where multiple image processing apparatuses are centrally managed.

Figure 7:
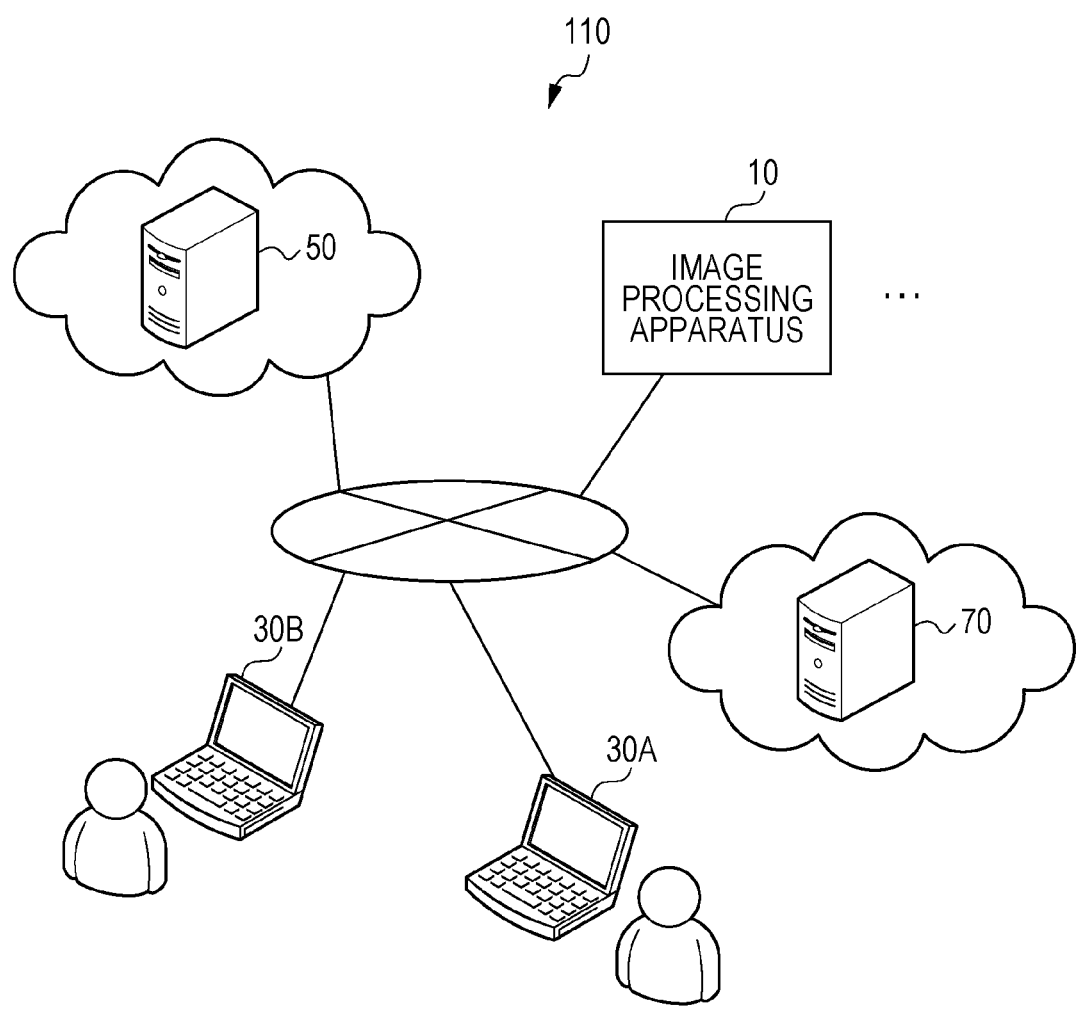
FIG. 7 illustrates an example of a configuration of an image processing system of a second exemplary embodiment.

FIG. 7 illustrates an example of a configuration of an image processing system 110 of the second exemplary embodiment.

Referring to FIG. 7, the image processing system 110 includes the image processing apparatus 10, user terminal 30A, administrator terminal 30B, print service server 50, and printer management server 70. The printer management server 70 provides the printer management service that manages multiple image processing apparatuses 10.

The printer management server 70 centrally manages management information (for example, including the identification information and position information) on the image processing apparatuses 10. The printer management server 70 transmits information to or receives information from each of the user terminal 30A and the image processing apparatuses 10 via the network. The user may reference the image processing apparatuses 10 registered on the printer management server 70 over a portal site provided by the printer management server 70. The printer management server 70 is an example of a printer management apparatus. The printer management server 70 may be a general-purpose computer, such as a server computer or personal computer (PC).

The image processing apparatuses 10, user terminal 30A, and printer management server 70 are interconnected to each other via a network including the Internet, LAN, and/or WAN. The image processing system 110 of the second exemplary embodiment is identical in configuration to the image processing system 100 of the first exemplary embodiment except that the image processing system 110 includes the printer management server 70. In the discussion of the image processing system 110, duplicate description is not provided.

Figure 8:
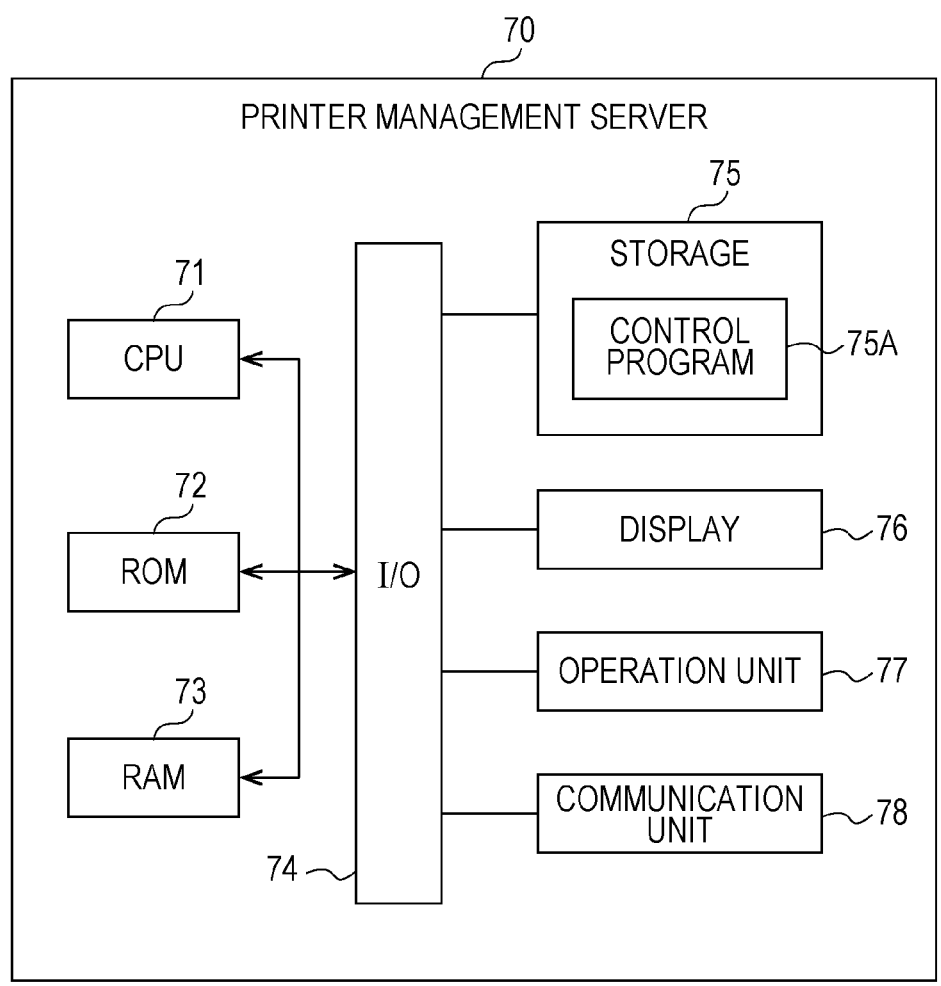
FIG. 8 is a block diagram illustrating an example of an electric configuration of a printer management server of the second exemplary embodiment.

FIG. 8 is a block diagram illustrating an electrical configuration of the printer management server 70 of the second exemplary embodiment.

Referring to FIG. 8, the printer management server 70 of the second exemplary embodiment includes CPU 71, ROM 72, RAM 73, IO interface 74, storage 75, display 76, operation unit 77, and communication unit 78.

The CPU 71, ROM 72, RAM 73, and IO interface 74 are interconnected to each other via a bus. The IO interface 74 connects to functional blocks including the storage 75, display 76, operation unit 77, and communication unit 78. The functional blocks is mutually communicable with the CPU 71 via the IO interface 74.

The CPU 71, ROM 72, RAM 73, and IO interface 74 form a controller. The controller may control part or whole of the process of the printer management server 70.

The storage 75 may be a HDD, SSD, or flash memory. The storage 75 stores a control program 75A of the second exemplary embodiment. The control program 75A may be stored on the ROM 72.

The control program 75A may be pre-installed on the printer management server 70. The control program 75A may be appropriately installed on the printer management server 70 by storing the control program 75A on a non-volatile recording medium or delivering the control program 75A via a network. Examples of the non-volatile memory include a CD-ROM, magneto-optical disk, HDD, DVD-ROM, flash memory, and memory card.

The display 76 may a liquid-crystal display (LCD) or organic electroluminescent (EL) display. The display 76 may include a touch panel that is integrated therewith. The operation unit 77 includes an operation input device, such as a keyboard and mouse. The display 76 and operation unit 77 receive a variety of instructions from the user of the printer management server 70. The display 76 displays results of operations performed in response to an instruction received from the user and a variety of information including a notification about an operation.

The communication unit 78 is connected to a network, including the Internet, LAN, and/or WAN and communicates with the user terminal 30A and image processing apparatus 10 via the network.

The CPU 71 in the printer management server 70 of the second exemplary embodiment executes the control program 75A. The CPU 71 thus receives the registration request from the user via the user terminal 30A and transmits to the image processing apparatus 10 the identification information on the administrator, having the administrative right to the print service server 50, together with the received registration request. The identification information on the administrator may be included in the registration request from the user or pre-registered in association with the image processing apparatus 10 on the printer management server 70. The identification information on the user may be included in the registration request from the user or pre-registered on the printer management server 70.

The printer management server 70 stores management information that includes identifiers and position information on pre-registered multiple image processing apparatuses 10. The printer management server 70 has a function to perform the registration request to register a specified image processing apparatus 10 and the user on the print service server 50 in response to the registration request from the user terminal 30A. Specifically, at the registration request, the user may specify the email address of the user and an identifier of the image processing apparatus 10 that the user wants to register on the print service server 50. If the email address of the administrator is not pre-registered in association with the image processing apparatus 10 on the printer management server 70, the user may further specify the email address of the administrator.

Referring to FIG. 4, the functions performed by the CPU 11 in the image processing apparatus 10 are described below.

The acquisition unit 11A acquires the registration request of the user via the printer management server 70 that has the image processing apparatus 10 pre-registered thereon. The acquisition unit 11A acquires from the printer management server 70 the email address of the administrator serving as an example of the identification information on the administrator.

In response to the registration request acquired by the acquisition unit 11A, the registration requester 11B requests the print service server 50 to register the image processing apparatus 10 and the user.

The authentication requester 11C emails the identification information acquired from the print service server 50 and the email address of the user serving as an example of the identification information on the user, to the email address of the administrator or to a terminal (such as the administrator terminal 30B) that the administrator identified by the identification information on the administrator has logged on. The authentication requester 11C thus requests the administrator to perform the authentication under the administrative right to register the image processing apparatus 10 and the user on the print service server 50.

Figure 9:
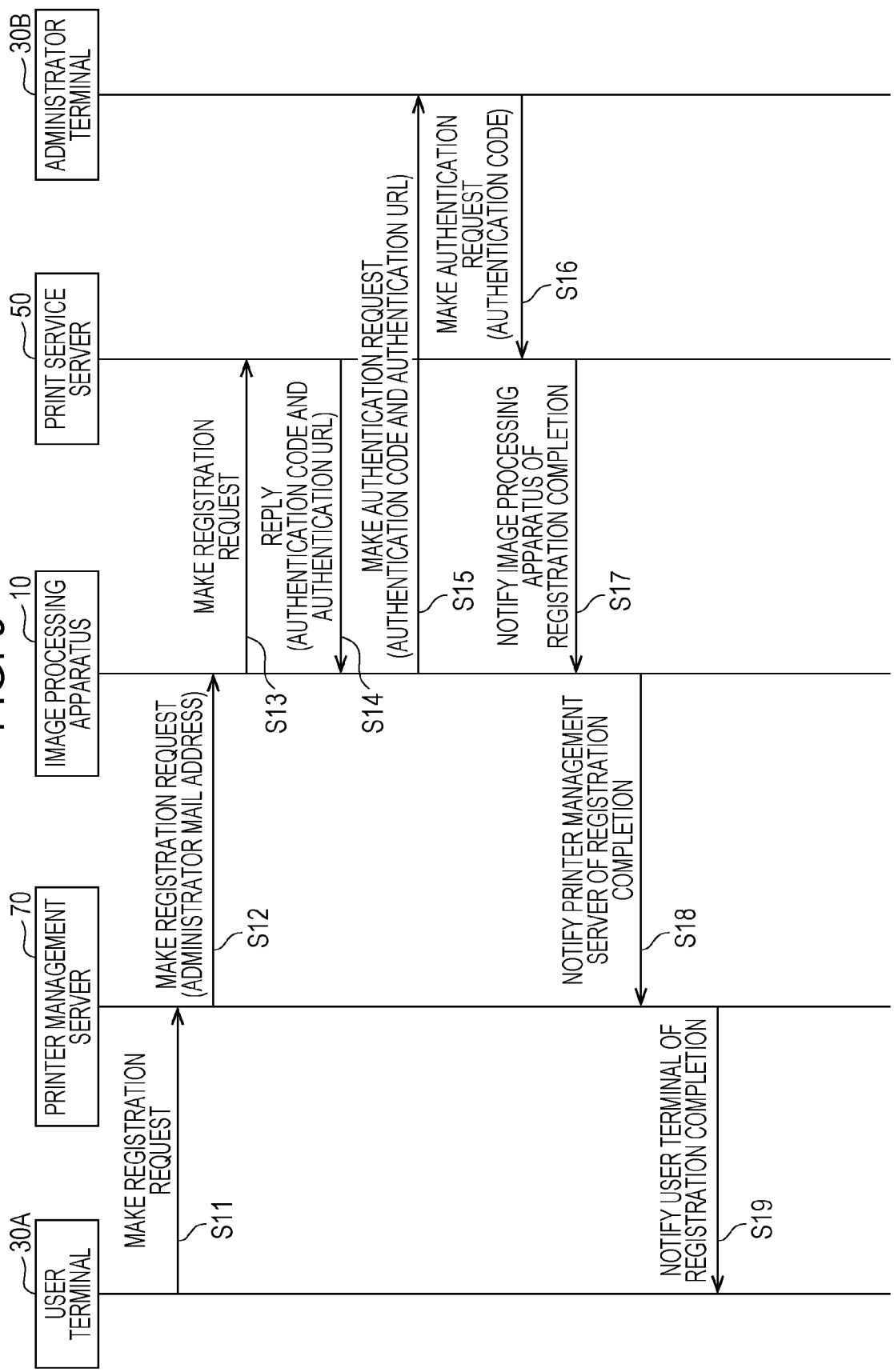
FIG. 9 is a sequence diagram illustrating a method of registering the image processing apparatus of the second exemplary embodiment and the user of the image processing apparatus.

Referring to FIG. 9, a method of registering the image processing apparatus 10 and the user in accordance with the second exemplary embodiment is specifically described.

FIG. 9 is a sequence diagram of the method registering the image processing apparatus 10 and the user in accordance with the second exemplary embodiment.

In step S11 in FIG. 9, the user transmits from the user terminal 30A to the printer management server 70 the registration request to request the printer management server 70 to register the image processing apparatus 10 and the user on the print service server 50. The registration request includes, for example, the email address of the user as the identification information on the user. The registration request also includes the identifier of the image processing apparatus 10 the user wants to register.

In step S12, in response to the registration request from the user terminal 30A, the printer management server 70 makes the registration request of the image processing apparatus 10 and the user to the image processing apparatus 10. The registration request includes the email address of the user serving as the identification information on the user and the email address of the administrator serving as the identification information on the administrator pre-registered on the printer management server 70 in association with the image processing apparatus 10.

In step S13, in response to the registration request from the printer management server 70, the image processing apparatus 10 makes the registration request of the image processing apparatus 10 and the user to the print service server 50. The acquisition of the registration request may be performed in a pull scheme. In the pull scheme, the image processing apparatus 10 inquires the printer management server 70 of the registration request by periodically polling the printer management server 70. The image processing apparatus 10 thus acquires the registration request. Alternatively, the acquisition of the registration request may be performed in a push scheme. In the push scheme, the printer management server 70 transmits the registration request to the image processing apparatus 10 with the image processing apparatus 10 and the printer management server 70 remaining in session connection. If the image processing apparatus 10 has been registered on the print service server 50, the next and subsequent steps are not performed. The administrator may be notified of the identification information on the user having made the registration request and may be requested to permit the user to use the image processing apparatus 10.

In step S14, in response to the registration request from the image processing apparatus 10, the print service server 50 transmits to the image processing apparatus 10 a reply including the authentication information used to register the image processing apparatus 10. The authentication information includes, for example, the authentication code and authentication URL.

In step S15, in response to the reply from the print service server 50, the image processing apparatus 10 emails to the email address of the administrator the authentication request including the identification information on the user and the authentication information.

In step S16, the administrator references the received email of the authentication request and accesses the print service server 50 using the authentication URL included in the authentication information. As described above, if the authentication URL is accessed, the print service server 50 creates a screen that receives the authentication code and the identification information on the user using the image processing apparatus 10 and provides the screen to the administrator terminal 30B. The administrator enters, on the screen displayed on the administrator terminal 30B, the authentication code and the identification information on the user having the right to use the image processing apparatus 10, and transmits the authentication code and identification information on the user to the print service server 50. The administrator thus makes the authentication request under administrative right to the print service server 50 to register the image processing apparatus 10 and the user. The administrator may enter user identification information and password of the administrator to be authenticated by the print service server 50.

In step S17, the print service server 50 performs authentication to register the image processing apparatus 10 and the user in response to the authentication request from the administrator terminal 30B. In response to successful authentication, the image processing apparatus 10 is notified of the registration completion. As described above, the print service server 50 authenticates the administrative right in accordance with the identification information and password on the administrator included in the authentication request and determines whether the received identification information on the user has been registered as a print service. If the identification information on the user has been registered, the image processing apparatus 10 is registered as being available to the user. If the identification information on the user has not been registered, the user is requested to perform authentication for the print service. If the print service is authenticated, the image processing apparatus 10 is registered as being available to the user. In the requesting to perform the authentication, an email with a URL of an authentication request screen attached thereto is transmitted to the email address serving as the identification information on the user and then a print service authentication screen is displayed by accessing the URL attached to the email. By entering account information on the print service and password on the print service authentication screen, the user may perform authentication. The notification of the registration completion may be performed in a pull scheme. In the pull scheme, the image processing apparatus 10 inquires the print service server 50 of the registration completion by periodically polling the print service server 50. The image processing apparatus 10 thus acquires the notification of the registration completion from the print service server 50. Alternatively, the notification of the registration completion may be performed in a push scheme. In the push scheme, the print service server 50 notifies the image processing apparatus 10 of the registration completion with the image processing apparatus 10 and the print service server 50 remaining in session connection.

In step S18, the image processing apparatus 10 notifies the printer management server 70 of the registration completion in response to the registration completion from the print service server 50.

In step S19, the printer management server 70 notifies the user terminal 30A of the registration completion in response to the registration completion from the image processing apparatus 10. In this way, the user may use the image processing apparatus 10 via the print service server 50. With the image processing apparatus 10 registered on the print service server 50, the user may upload printed matter to the print service server 50, the print service server 50 may create a print job printable on the image processing apparatus 10, and the image processing apparatus 10 acquires print job from the print service server 50 to print out the printed matter.

The process of the image processing apparatus 10 of the second exemplary embodiment is described below with reference to FIG. 10.

Figure 10:
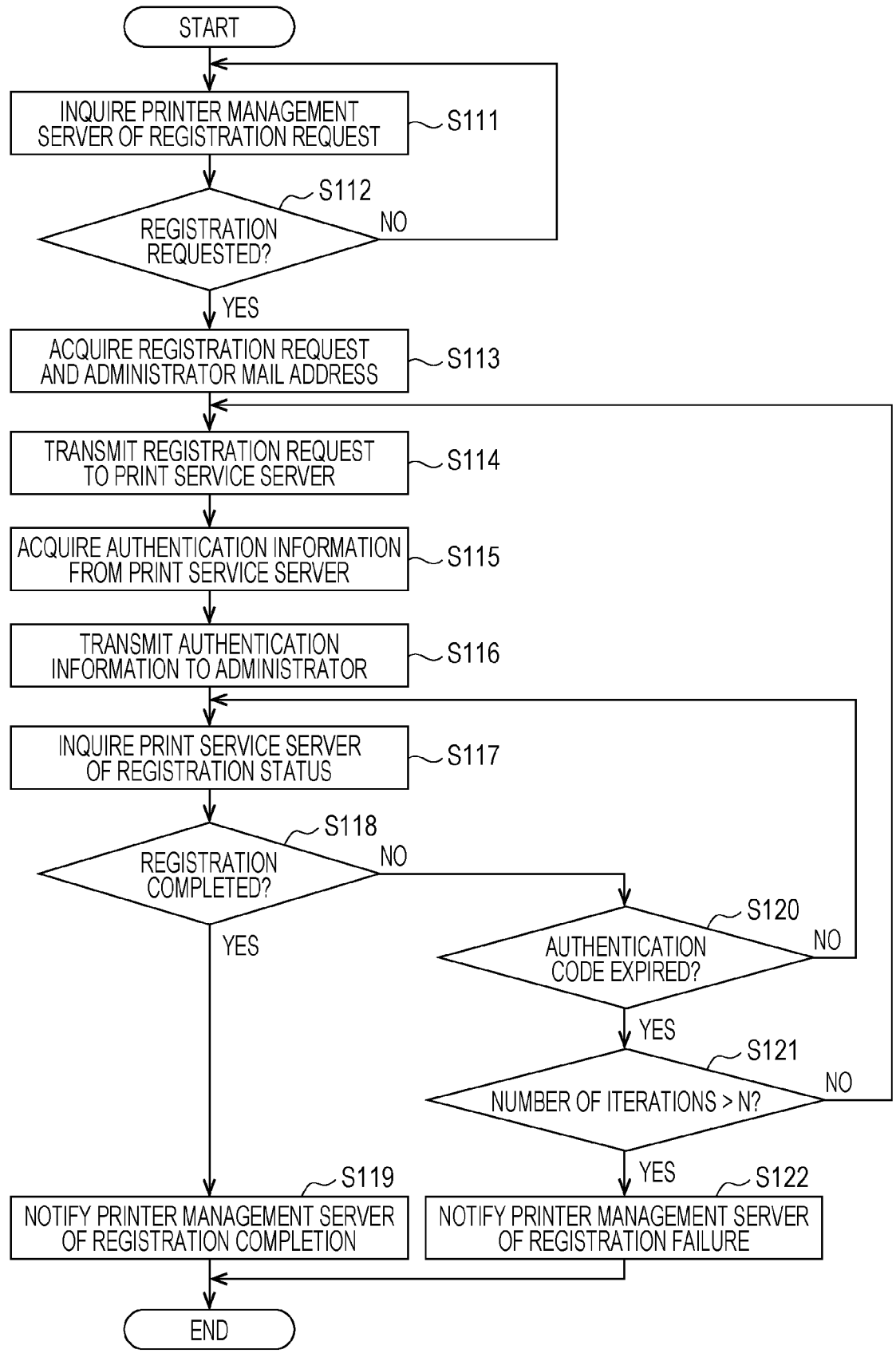
FIG. 10 is a flowchart illustrating a flow of a process of a registration program of the second exemplary embodiment.

FIG. 10 is a flowchart illustrating the flow of the process of the registration program 15A of the second exemplary embodiment.

When the image processing apparatus 10 is instructed to perform a printer registration operation, the CPU 11 starts up the registration program 15A and performs operations in steps described below.

In step S111 in FIG. 10, the CPU 11 inquires the printer management server 70 whether the user has issued the registration request requesting the print service server 50 to register the image processing apparatus 10 and the user thereon. The registration request from the user is acquired from the user terminal 30A via the printer management server 70. The registration request includes the email address of the user serving as an example of the identification information on the user. The email address of the administrator serving as an example of the identification information on the administrator is pre-stored in association with the image processing apparatus 10 on the printer management server 70.

In step S112, in response to a reply to the inquiry in step S111, the CPU 11 determines whether the printer management server 70 has received the registration request. If the CPU 11 determines that the printer management server 70 has received the registration request (yes path in step S112), the process proceeds to step S113. If the CPU 11 determines that the printer management server 70 has not received the registration request (no path in step S112), the process returns to step S111 to make the inquiry again.

In step S113, the CPU 11 acquires from the printer management server 70 the registration request of the image processing apparatus 10 and the user and the email address of the administrator.

In step S114, the CPU 11 performs control to transmit the registration request acquired in step S113 to the print service server 50.

In step S115, the CPU 11 acquires from the print service server 50 the authentication information to be used to register the image processing apparatus 10. As previously described, the authentication information includes the authentication code and authentication URL.

In step S116, the CPU 11 transmits the authentication information acquired in step S115 and the attribute information on the user to the administrator identified by the email address of the administrator and requests the administrator to perform the authentication under the administrative right to register the image processing apparatus 10 and the user on the print service server 50.

In step S117, by inquiring the print service server 50 of the registration status on the image processing apparatus 10 and the user, the CPU 11 determines whether the print service server 50 has completed the registration of the image processing apparatus 10 and the user based on the authentication under the administrative right.

In step S118, in response to the results of the inquiry in step S117, the CPU 11 determines whether the registration of the image processing apparatus 10 and the user on the print service server 50 has been completed. If the CPU 11 determines that the image processing apparatus 10 and the user have been registered (yes path in step S118), the process proceeds to step S119. If the CPU 11 determines that the image processing apparatus 10 and the user have not been registered (no path in step S118), the process proceeds to step S120.

In step S119, the CPU 11 notifies the printer management server 70 of the registration completion of the image processing apparatus 10 and the user and then completes the series of operations of the registration program 15A. The notification of the registration completion is transmitted from the printer management server 70 to the user terminal 30A.

In step S120, the CPU 11 determines whether the authentication code included in the authentication information has expired (i.e., whether the authentication code is valid). If the CPU 11 determines that the authentication code has expired (is not valid) (yes path in step S120), the process proceeds to step S121. If the CPU 11 determines that the authentication code has not expired (is valid) (no path in step S120), the process returns to step S117 and the CPU 11 makes the inquiry again.

In step S121, the CPU 11 determines whether the number of iterations of the registration request of the image processing apparatus 10 and the user has exceeded a predetermined number of times set on the image processing apparatus 10 (N times). If the CPU 11 determines that the number of iterations has exceeded N (yes path in step S121), the process proceeds to step S122. If the CPU 11 determines that the number of iterations is equal to or below N (no path in step S121), the process returns to step S114 for iteration.

In step S122, the CPU 11 notifies the printer management server 70 of a registration failure of the image processing apparatus 10 and the user and completes the series of operations of the registration program 15A. The notification of the registration failure is transmitted from the printer management server 70 to the user terminal 30A.

In the embodiments above, the term "processor" refers to hardware in a broad sense. Examples of the processor include general processors (e.g., CPU: Central Processing Unit) and dedicated processors (e.g., GPU: Graphics Processing Unit, ASIC: Application Specific Integrated Circuit, FPGA: Field Programmable Gate Array, and programmable logic device).

In the embodiments above, the term "processor" is broad enough to encompass one processor or plural processors in collaboration which are located physically apart from each other but may work cooperatively. The order of operations of the processor is not limited to one described in the embodiments above, and may be changed.

The image processing apparatus of the exemplary embodiment has been described. The exemplary embodiment may be implemented as a program causing a computer to perform the functions of the image processing apparatus. The exemplary embodiments may be implemented as a non-transitory computer readable recording medium having recorded the program.

The flows of the processes of the programs described above have been described for exemplary purposes only. Without departing from the scope of the disclosure, a step may be added to or removed from the processes or the order of the steps may be changed.

The exemplary embodiments are implemented by a software configuration when the processes of the exemplary embodiments are performed by a computer executing the program. The exemplary embodiments may be implemented by a hardware configuration, software configuration, or a combination thereof.

The foregoing description of the exemplary embodiments of the present disclosure has been provided for the purposes of illustration and description. It is not intended to be exhaustive or to limit the disclosure to the precise forms disclosed. Obviously, many modifications and variations will be apparent to practitioners skilled in the art. The embodiments were chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

What is claimed is:

1. An image processing apparatus comprising:
    a processor configured to:
        acquire a registration request that a user uses to request a print service apparatus to register the image processing apparatus and the user;
        acquire identification information on an administrator having an administrative right to the print service apparatus;
        in response to the registration request, request the print service apparatus to register the image processing apparatus and the user; and
        request the administrator identified by the identification information to perform authentication under the administrative right to register the image processing apparatus and the user on the print service apparatus by transmitting, to the administrator, authentication information, used to register the image processing apparatus, and identification information on the user that are acquired from the print service apparatus, wherein the authentication information acquired from the print service apparatus includes an authentication code and an authentication uniform resource locator (URL).

2. The image processing apparatus according to claim 1, wherein the processor is configured to acquire the registration request of the user from the user terminal of the user via a printer management apparatus that is connected to the user terminal and the image processing apparatus and has registered the image processing apparatus.

3. The image processing apparatus according to claim 2, wherein the identification information on the administrator is pre-registered in association with the image processing apparatus on the printer management apparatus.

4. The image processing apparatus according to claim 3, wherein the processor is configured to, if the authentication code has expired, acquire a new authentication code and a new authentication URL from the print service apparatus by iterating the registration request requesting the print service apparatus to register the image processing apparatus and the user on the print service apparatus.

5. The image processing apparatus according to claim 4, wherein the processor is configured to try making the registration request of the image processing apparatus and the user by a predetermined number of times.

6. The image processing apparatus according to claim 5, wherein the identification information on the administrator is an email address of the administrator, and
    wherein the identification information on the user is an email address of the user.

7. The image processing apparatus according to claim 3, wherein the identification information on the administrator is an email address of the administrator, and
    wherein the identification information on the user is an email address of the user.

8. The image processing apparatus according to claim 4, wherein the identification information on the administrator is an email address of the administrator, and
    wherein the identification information on the user is an email address of the user.

9. The image processing apparatus according to claim 2, wherein the identification information on the administrator is an email address of the administrator, and
    wherein the identification information on the user is an email address of the user.

10. The image processing apparatus according to claim 2, wherein the processor is configured to, if the authentication code has expired, acquire a new authentication code and a new authentication URL from the print service apparatus by iterating the registration request requesting the print service apparatus to register the image processing apparatus and the user on the print service apparatus.

11. The image processing apparatus according to claim 10, wherein the processor is configured to try making the registration request of the image processing apparatus and the user by a predetermined number of times.

12. The image processing apparatus according to claim 11, wherein the identification information on the administrator is an email address of the administrator, and
    wherein the identification information on the user is an email address of the user.

13. The image processing apparatus according to claim 10, wherein the identification information on the administrator is an email address of the administrator, and
    wherein the identification information on the user is an email address of the user.

14. The image processing apparatus according to claim 1, wherein the processor is configured to, if the authentication code has expired, acquire a new authentication code and a new authentication URL from the print service apparatus by iterating the registration request requesting the print service apparatus to register the image processing apparatus and the user on the print service apparatus.

15. The image processing apparatus according to claim 14, wherein the processor is configured to try making the registration request of the image processing apparatus and the user by a predetermined number of times.

16. The image processing apparatus according to claim 15, wherein the identification information on the administrator is an email address of the administrator, and
wherein the identification information on the user is an email address of the user.

17. The image processing apparatus according to claim 14, wherein the identification information on the administrator is an email address of the administrator, and
wherein the identification information on the user is an email address of the user.

18. The image processing apparatus according to claim 1, wherein the identification information on the administrator is an email address of the administrator, and
wherein the identification information on the user is an email address of the user.

19. An image processing system comprising an image processing apparatus, a user terminal, and a printer management apparatus that is connected to each of the user terminal and the image processing apparatus and has registered the image processing apparatus,
wherein a processor in the printer management apparatus is configured to: receive from the user terminal a registration request that a user uses to request a print service apparatus to register the image processing apparatus and the user; and transmit, to the image processing apparatus, identification information on an administrator, having an administrative right to the print service apparatus, together with the registration request, and
wherein a processor in the image processing apparatus is configured to:
acquire from the printer management apparatus the registration request and the identification information on the administrator;
in response to the registration request, request the print service apparatus to register the image processing apparatus and the user; and
request the administrator identified by the identification information to perform authentication under the administrative right to register the image processing apparatus and the user on the print service apparatus by transmitting, to the administrator, authentication information, used to register the image processing apparatus, and identification information on the user acquired from the print service apparatus.

20. A non-transitory computer readable medium storing a program causing a computer to execute a process, the process comprising:
acquiring a registration request that a user uses to request a print service apparatus to register the image processing apparatus and the user;
acquiring identification information on an administrator having an administrative right to the print service apparatus;
in response to the registration request, requesting the print service apparatus to register the image processing apparatus and the user; and
requesting the administrator identified by the identification information to perform authentication under the administrative right to register the image processing apparatus and the user on the print service apparatus by transmitting, to the administrator, authentication information, used to register the image processing apparatus, and identification information on the user acquired from the print service apparatus, wherein the authentication information acquired from the print service apparatus includes an authentication code and an authentication uniform resource locator (URL).

* * * * *